(12) United States Patent
Hurewitz

(10) Patent No.: US 7,761,797 B2
(45) Date of Patent: Jul. 20, 2010

(54) INTERACTIVE USER INTERFACE FOR DISPLAYING CORRELATION

(75) Inventor: Barry S. Hurewitz, New York, NY (US)

(73) Assignee: Morgan Stanley, New York, NY (US)

( * ) Notice: Subject to any disclaimer, the term of this patent is extended or adjusted under 35 U.S.C. 154(b) by 0 days.

(21) Appl. No.: 12/539,230

(22) Filed: Aug. 11, 2009

(65) Prior Publication Data

US 2009/0326973 A1 Dec. 31, 2009

Related U.S. Application Data

(63) Continuation of application No. 11/247,505, filed on Oct. 11, 2005, now Pat. No. 7,590,940.

(51) Int. Cl.
G06F 3/00 (2006.01)
G06F 3/14 (2006.01)

(52) U.S. Cl. .................. 715/738; 715/765; 715/780; 715/810; 715/205; 709/219

(58) Field of Classification Search ............... 715/733, 715/738, 764, 765, 780, 781, 783, 804, 810, 715/841, 856, 862, 968, 205; 705/10; 707/104.1; 709/203, 217, 219

See application file for complete search history.

(56) References Cited

U.S. PATENT DOCUMENTS

| 6,338,067 B1 * | 1/2002 | Baker et al. ............... 707/100 |
| 2002/0035502 A1 * | 3/2002 | Raza ......................... 705/10 |
| 2005/0108262 A1 * | 5/2005 | Fawcett et al. ............. 707/100 |
| 2005/0114774 A1 * | 5/2005 | Berryman .................. 715/700 |

* cited by examiner

Primary Examiner—X. L Bautista
(74) Attorney, Agent, or Firm—K&L Gates LLP

(57) ABSTRACT

Methods and systems for providing a user interface to a user may comprise finding a degree of similarity between each of a plurality of potential similar companies and a focal company. From the plurality of potential similar companies, at least one similar company may be selected having a degree of similarity with the focal company that is greater than a first threshold. An identifier of the focal company may be listed in a focal company field. Identifiers for the at least one similar company may be listed in a similar company field. Certain of the identifiers listed in the similar company field may include a hyperlink which, when activated by a user, causes a computer system to list the company corresponding to the activated hyperlink as a new focal company in the focal company field; determine at least one new similar company having a degree of similarity with the new focal company that is greater than the first threshold; and display the at least one new similar company at the similar company field.

24 Claims, 7 Drawing Sheets

INTERACTIVE USER INTERFACE FOR DISPLAYING CORRELATION

This application is a continuation of co-pending U.S. patent application Ser. No. 11/247,505 filed on Oct. 11, 2005, which is incorporated herein by reference in its entirety.

BACKGROUND OF INVENTION

The present invention is directed generally to systems and methods for presenting relationships between various financial attributes of companies in an interactive manner.

A large amount of financial information describing companies is available. It is a considerable challenge to quickly summarize the relationships across companies for different financial statement items. Accordingly, there is a pressing need to analytically and visually assimilate how companies are related to each other in various ways and to be able to navigate through information describing the companies based on the relationships.

SUMMARY OF THE INVENTION

In one general aspect, the present invention is directed to interactive user interfaces that allow users to quickly and visually navigate the financial relationships between companies. In one embodiment, the interactive user interface may include a focal company field where a user can input an identifier for a focal company. The interface also includes a focal company metric input field that allows the user to select a financial metric for the focal company. Using a related company metric input field, the user can select a related company metric to be correlated to the focal company metric. Based on the chosen metrics, a positive correlation field lists identifiers for companies whose related company metric is positively correlated to the focal company metric and a negative correlation field lists identifiers for companies whose related company metric is negatively correlated to the focal company metric. Also, a non-correlation field may list identifiers for companies whose related company metric is not correlated to the focal company metric. Further, certain of the identifiers listed in the fields may include a hyperlink which, when activated by the user, causes the identifier corresponding to the activated hyperlink to be listed as a new focal company in the focal company field such that the positive correlation field lists identifiers for companies whose related company metric is positively correlated to the focal company metric of the new focal company, the negative correlation field lists identifiers for companies whose related company metric is negatively correlated to the focal company metric of the new focal company, and the non-correlation field is repopulated with a list of identifiers for companies whose related company metric is not correlated to the focal company metric of the new focal company.

In another embodiment the user interface may include, in addition to the focal company input field, a related companies input field for selecting related companies, a metric input field for selecting a set of financial metrics and a metric weight input field for choosing the relative weights for the metrics of the set. Based on the chosen metric(s) and corresponding weight(s), a first field may list identifiers for companies whose weighted values for the selected metrics are closest to the weighted value for the focal company. A second field may list companies whose weighted values for the selected metrics are moderately similar to the weighted values for the focal company, and a third field may list companies whose weighted values for the selected metrics are least similar to those of the focal company. Again, certain of the identifiers in the fields may include hyperlinks which, when activated by a user, cause the identifier corresponding to the activated hyperlink to be listed as a new focal company in the focal company field. The first, second, and third fields are further repopulated based on the new focal company.

Embodiments of the present invention are also directed to systems for providing the interactive user interfaces as well as methods pertaining to the display of information using the user interfaces.

DESCRIPTION OF THE FIGURES

Embodiments of the present invention are described below by way of example in conjunction with the following figures, wherein.

DESCRIPTION OF THE INVENTION

Figure 1:
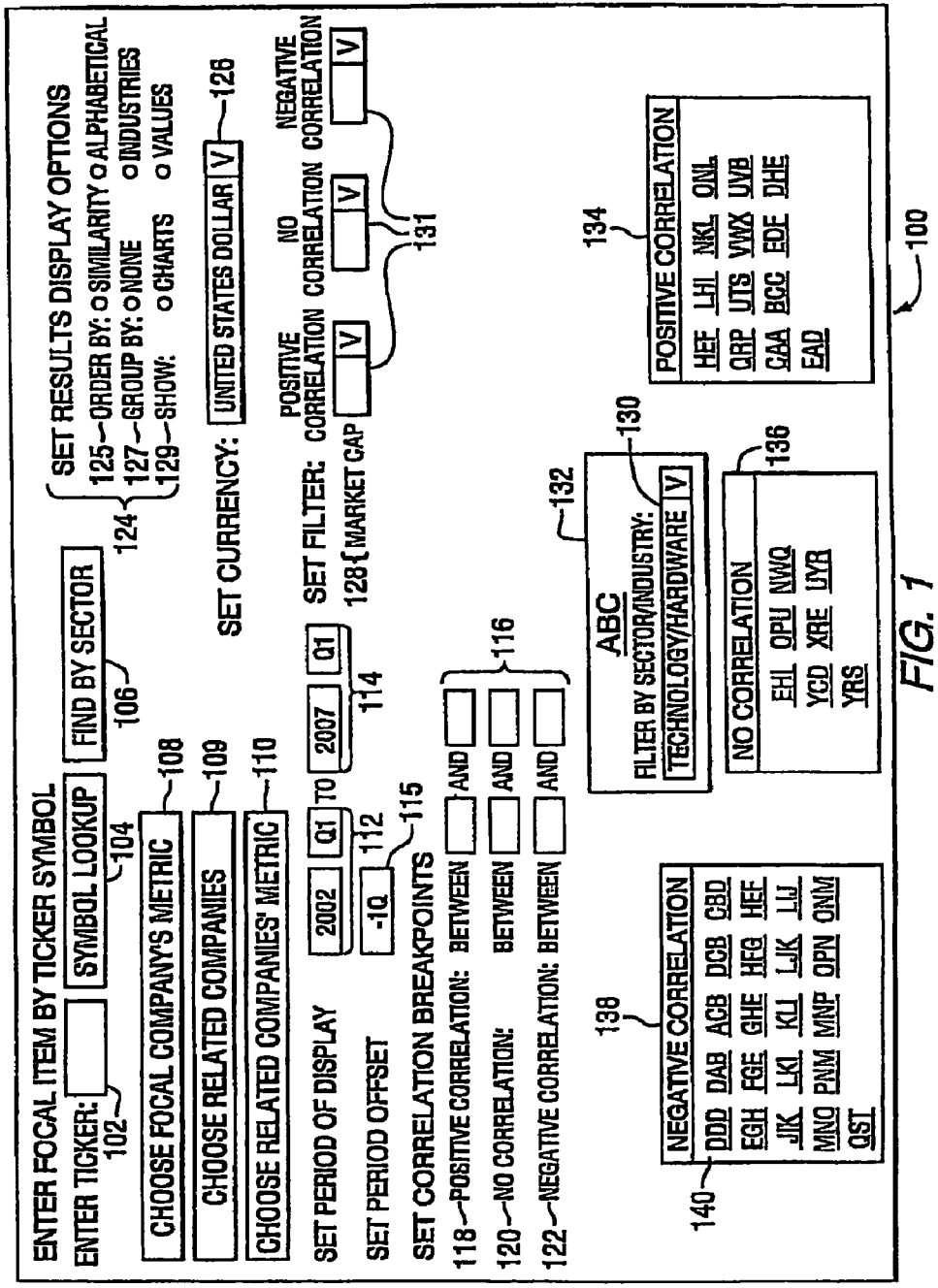
FIGS. 1, 1A, 2, 3, 4 and 5 are diagrams of an interactive user interface according to various embodiments of the present invention.

FIG. 1 shows a diagram of an interactive user interface 100 according to various embodiments of the present invention. The interface 100 may allow, for example, a user to display an identifier of a focal company (e.g., ticker symbol, etc.) in field 132, along with identifiers for groups of related companies in fields 134, 136, and 138. The groups of related companies may be selected based on a degree of correlation between an attribute or metric of the focal company and an attribute or metric of the various related companies. The metric of the focal company may be the same as or different than the metric of the other companies. Identifiers of related companies whose chosen metric is positively correlated to the focal company metric may be listed in field 134. Identifiers of related companies whose chosen metric is negatively correlated to the focal company metric may be listed in field 138, while identifiers of related companies whose related company metric shows no correlation to the focal company metric may be listed in field 136. The user may select various parameters affecting the display of companies in fields 134, 136 and 138, for example, as described below. The user may be presented with the interface 100, as described further below in connection with FIG. 6, using a computing device (not shown) having a monitor and browsing software to display the interface 100 based on pages from a server 610.

In the interface 100, the user may select the focal company, for example, by entering an identifier of the focal company in the input focal company input field 102. The identifier may be any representation of the company including, for example, a stock trading (or ticker) symbol for the company. The interface 100 may also provide one or more look-up features for selecting the focal company. For example, clicking on the "Symbol Lookup" field (e.g., a button) 104 may allow the user to access a look-up feature. The look-up feature may allow the user to look-up an identifier for a focal company according to various company parameters including, for example, company name, industry sector, etc. In various embodiments, the interface 100 may also provide a classification-based look-up feature, for example, when the user clicks on the "Find by Sector" field 106. The classification-based look-up feature may allow the user to browse potential focal companies organized according to a classification system. The classification system may be the Global Industry Classification System (GICS), a proprietary classification system, or any other suitable classification system.

Figure 3:
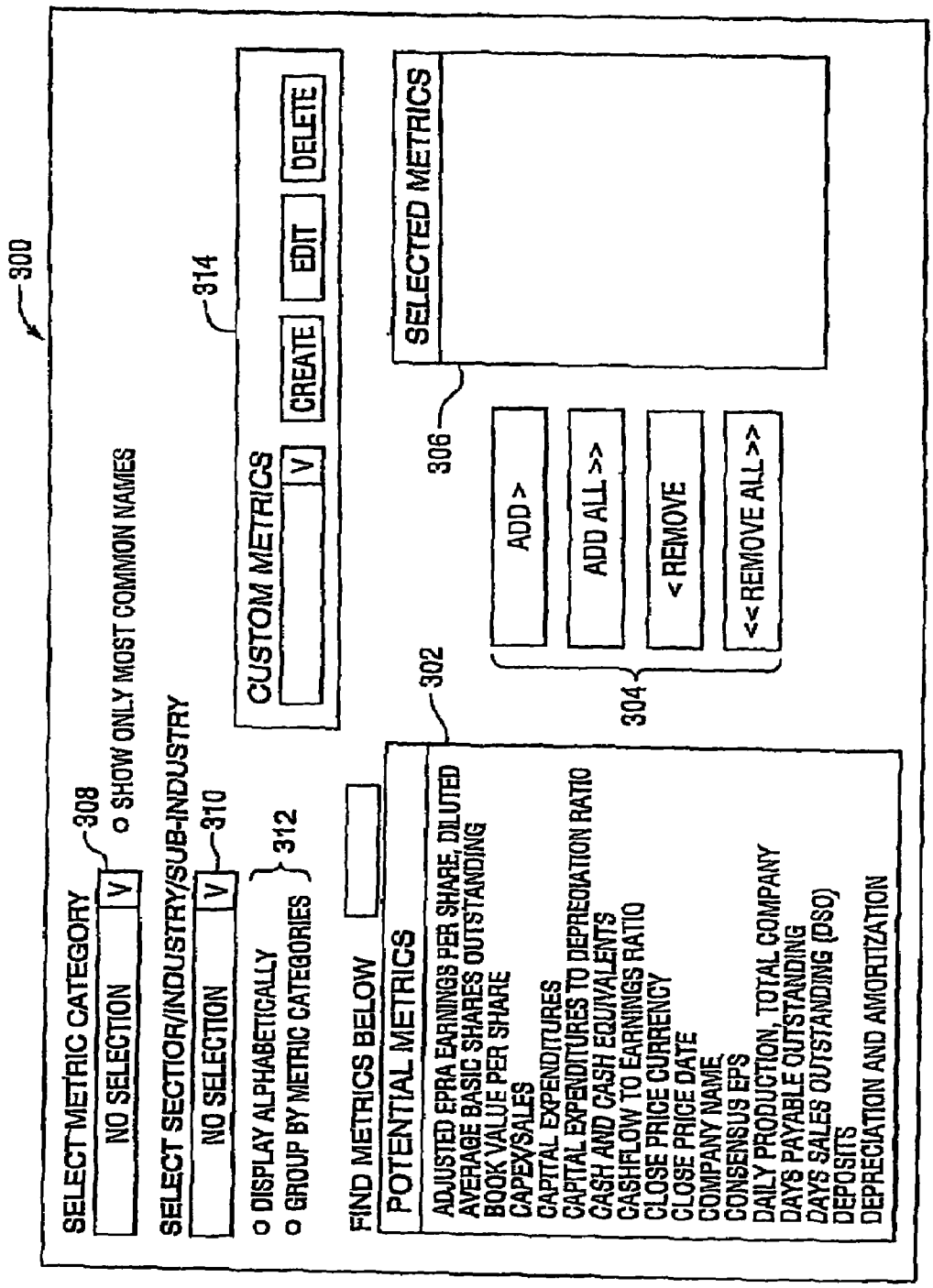

The user may select the metric or attribute of the focal company to be correlated with potential related companies by clicking on the "Choose Focal Company's Metric" field 108. Clicking on field 108 may launch a metric selection interface 300, for example, as shown in FIG. 3. Interface 300 may include an input field 302 listing potential metrics that may be selected. It will be appreciated that potential metrics may include, for example, financial statement items of the company, such as return on equity (ROE), net operating assets, earnings per share, earnings growth, sales growth, etc. The user may highlight a desired potential metric in field 302 and then click on the "Add" button from field 304 to transfer the potential metric to a selected metrics field 306.

In various embodiments, the list of potential metrics included in input field 302 may be filtered based on various criteria. For example, metrics may be filtered by category by selecting a category in input field 308, (e.g., a drop-down menu). Metrics may also be filtered by sector/industry/sub-industry classification by selecting from input field 310. For example, selecting a classification from menu 310 may cause the input field 302 to display only potential metrics specific to the classification. The classification system for classifying potential metrics in input field 308 may be any suitable classification system including, for example, the GICS system or a proprietary system. The user may cause the potential metrics to be listed by category and/or in alphabetical order by selecting the appropriate identifier from input field 312.

In various embodiments, the user may also create a custom metric using input field 314. A custom metric may be created, for example, by performing a mathematical operation on one or more of the list of potential metrics.

Figure 4:
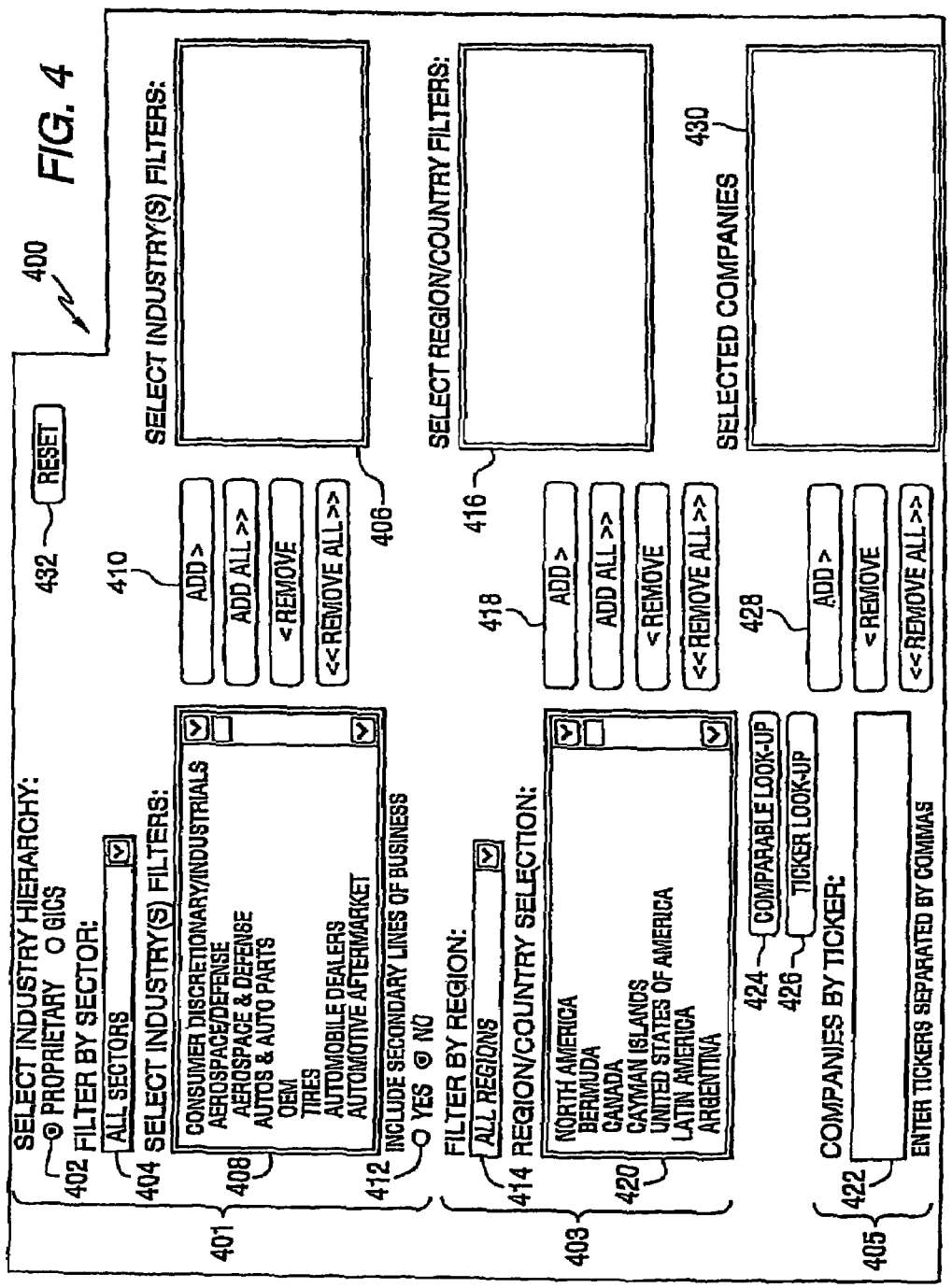

Referring back to FIG. 1, the user may filter the set of potential related companies by selecting the "Choose Related Companies" input field 109. Selecting the field 109 may cause user interface 400, shown in FIG. 4, to be served to the user. Interface 400 includes a field group 401 for filtering potential related companies by industry, a field group 403 for filtering potential related companies by location, and a field group 405 for adding specific companies to the filtered list of potential related companies.

Field group 401 provides a filter of potential related companies based on industry classification. The user may select an industry hierarchy in field 402. Exemplary hierarchies include the GICS classification discussed above, proprietary classifications, etc. Classification units (e.g., industries, sub-industries, etc.) within the hierarchy selected at field 402 are listed in field 408. The user may configure field 408 to display only classification units in a selected sector of the hierarchy, for example, by selecting the sector from drop-down menu 404. One or more classification units may be applied to the set of potential related companies by highlighting the desired classification unit in field 408 and selecting the "Add" button from field 410. A list of selected classification units is shown in "Selected Industry Filters" field 406. In general, classification units may be transferred between field 408 and field 406 using the "Add" "Add All" "Remove" and "Remove All" buttons in group 410 as is known in the art. At field 412 a user may indicate whether companies with secondary lines of business in the selected classification unit will be included in the filtered set of potential related companies.

Field group 403 provides a filter of potential related companies by location or region. A list of all available regions may be shown in field 420. The user may limit the regions shown in field 420 by selecting a group of regions from drop-down menu 414. For example, if "North America" is chosen from menu 414, then field 420 will display regions within North America including, for example, "Bermuda," "Canada," "Cayman Islands," "United States of America," etc. The user may select a region as part of the filter by highlighting the region in field 420 and selecting the "Add" button from field 418. The list of "Selected Region/Country Filters" may be shown in field 416.

The results of the filters selected in field groups 401 and 403 (e.g., a set of identifiers for a filtered set of potential related companies) may be shown in field 430. In various non-limiting embodiments, the filters selected in field groups 401 and 403 may be applied successively. For example, the field 430 may show all companies within the classification units selected at group 401 that are also within the regions selected at group 403.

Field group 405 allows the user to select additional companies to be included in the filtered list of potential related companies shown in field 430. For example, the user may type an indicator for a company (e.g., a ticker symbol) into field 422. Field 426 may allow the user to look-up the indicator for a company and include it in field 422. Field 424 may allow the user to look up companies comparable to the company or companies listed at field 422. Indicators for the comparable companies may be listed in field 422. Whether a company is comparable to the company or companies listed at field 422 may be determined according to any suitable criteria. Companies listed in field 422 may be transferred to the filter list of potential related companies at field 430 by selecting the "Add" button from field group 428.

Again referring back to FIG. 1, the user may select a related company metric by activating the "Choose Related Company's Metric" input field 110. The related company metric may be the same as or different from the focal company's metric. For example, the related company metric may be sales growth while the focal company metric may be return on equity (ROE). Selecting the input field 110 may launch the metric selection interface 300, shown in FIG. 3, which allows the user to select the related company's metric in a manner similar to that described above with respect to the focal company metric.

In the interface 100, the user may also select the time period for the correlation analysis at input fields 112 and 114. The correlation time period is the time period over which the correlation between the focal company metric and the metrics of the related companies is determined. A start time for the period of display may be entered at input field 112, while a finish time may be entered at input field 114. The time period may be measured in any unit of time for which there is adequate corporate financial information available, such as, quarters. The correlation time may span a number of time units (e.g., quarters), preferably three or more.

At input field 115, the user may also enter a period offset. The correlation operation may compare the focal company metric from a first time period with the related company metrics from a second time period. The difference between the first time period and the second time period may be the period offset. The offset may be zero, or it may be, for example, a number of time units (e.g., quarters). For example, the focal company metric from the first quarter of 2005 may be correlated with the related company metric from the fourth quarter of 2004. This may be useful in situations where the there is a time lag between the occurrence of one metric and its effect on another.

The user may set correlation breakpoints at input field 116. The correlation breakpoints may limit, for example, the potential related companies displayed in fields 134, 136, 138 to those having a related company metric within a predetermined range of correlation to the focal company metric. For example, the user may configure, the interface 100 such that the positive correlation field 134 only displays companies whose related company metric has a correlation factor relative to the focal company falling within a given range by entering that range in input field 118. The correlation factor may be determined according to any suitable method for determining correlation. It will appreciated that the ranges of correlation factors for related companies shown in fields 136 and 138 may be similarly bounded by entering ranges in input fields 120, 122.

In order to provide the user with the ability to quickly and visually navigate through the relationships between companies, certain of the identifiers of companies listed in fields 134, 136, 138 may contain hyperlinks that, when activated by the user, generate a new display with the company corresponding to the activated hyperlink in the focal company field 132 to be the new focal company. The hyperlinks may be activated using conventional input devices, such as, for example, a mouse, to move a cursor over the hyperlink and activate it by clicking a button on the input device. The fields 134, 136 and 138 may then be populated with identifiers for companies that are positively correlated, non-correlated and negatively correlated respectively to the new focal company. In this way, a user can quickly and visually page through the relationships of different focal companies.

Figure 1A:
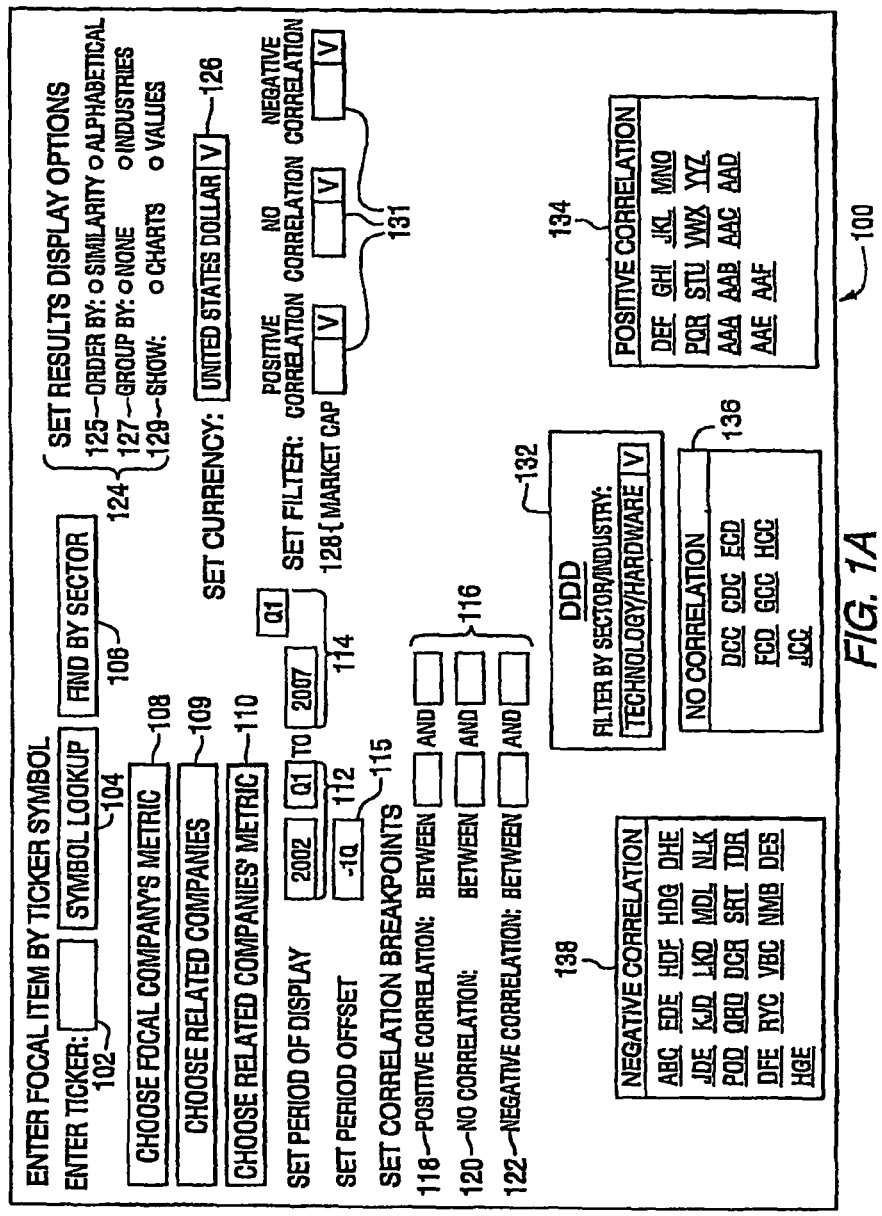

For example, in FIG. 1, company ABC is listed as the focal company and company DDD is listed in field 138. By activating the hyperlink 140 associated with company DDD, the user causes company DDD to become a new focal company listed in field 132, as shown by FIG. 1A. The fields 134, 136 and 138 are then repopulated based on a degree of correlation between the chosen focal company metric for company DDD and the chosen related company metric for the other companies. Thus, the metric used in the correlation analysis for company DDD is the original focal company metric chosen by the user for company ABC and the related company metric is also the same. After the transition, however, the user may, of course, change the metrics or the focal company.

Also, certain of the identifiers of companies listed in fields 134, 136, 138 may have an associated mouseover, such that when the user passes a cursor near the identifier, for example, using a pointing device, such as a mouse, a display window (not shown) including additional information about the company, such as, for example, the full name of the company and its industry, sector, etc., is displayed to the user.

In various embodiments, the user may wish to filter the companies listed in fields 134, 136 and 138. For example, in one non-limiting embodiment, the user may filter the listed companies by one or more factors including, for example, market capitalization, number of employees, etc., using input field 128. For example, dropdown menus 131 may allow the user to select a filter parameter, (e.g., a minimum market capitalization) for related companies for each of the input fields 134, 136, 138. The user may also set the currency to be used for correlation by selecting from input field 126.

The user may also configure the results display at input field 124. For example, the order of related companies shown in fields 134, 136, 138 may be selected in input field 125. Potential orders include, for example, an order by similarity between the companies and alphabetical order. Also, the user may group the related companies, such as by industry, at input field 127. In addition, the user may choose to have charts and/or values showing the degree of correlation displayed in the fields 134, 136, 138.

The related companies shown in fields 134, 136, 138 may be further filtered by selecting a sector/industry from input field 130. This filter may be applied in addition to or instead of one or more of the filters discussed above with respect to FIG. 4. Sectors/industries listed in input field 130 may be determined, for example, according to the GICS classification or any suitable classification system. It will be appreciated that the interface 100 may include various other fields for performing various other operations on the results without departing from the scope of the present invention.

It will be appreciated that the interactive user interface 100 shown in FIG. 1 may provide benefits to financial industry professionals, business people, etc., for a variety of purposes. For example, navigating the interface 100 may indicate whether certain metrics or attributes of certain companies move together and provide insight into why. In another example, using the interface 100 to compare a focal company metric with the time-lagged value of a related company metric may show dependencies between the two, allowing future values of the focal company metric to be predicted based on current values of the related company metric. For example, a focal company's return on equity (ROE) may rise or fall in response to rises or falls in the sales growth of related companies occurring a quarter or more earlier. In that case, the future ROE of the focal company may be predicted, for example, a quarter or more into the future based on whether the current sales growth of the related companies is currently rising or falling.

Figure 2:
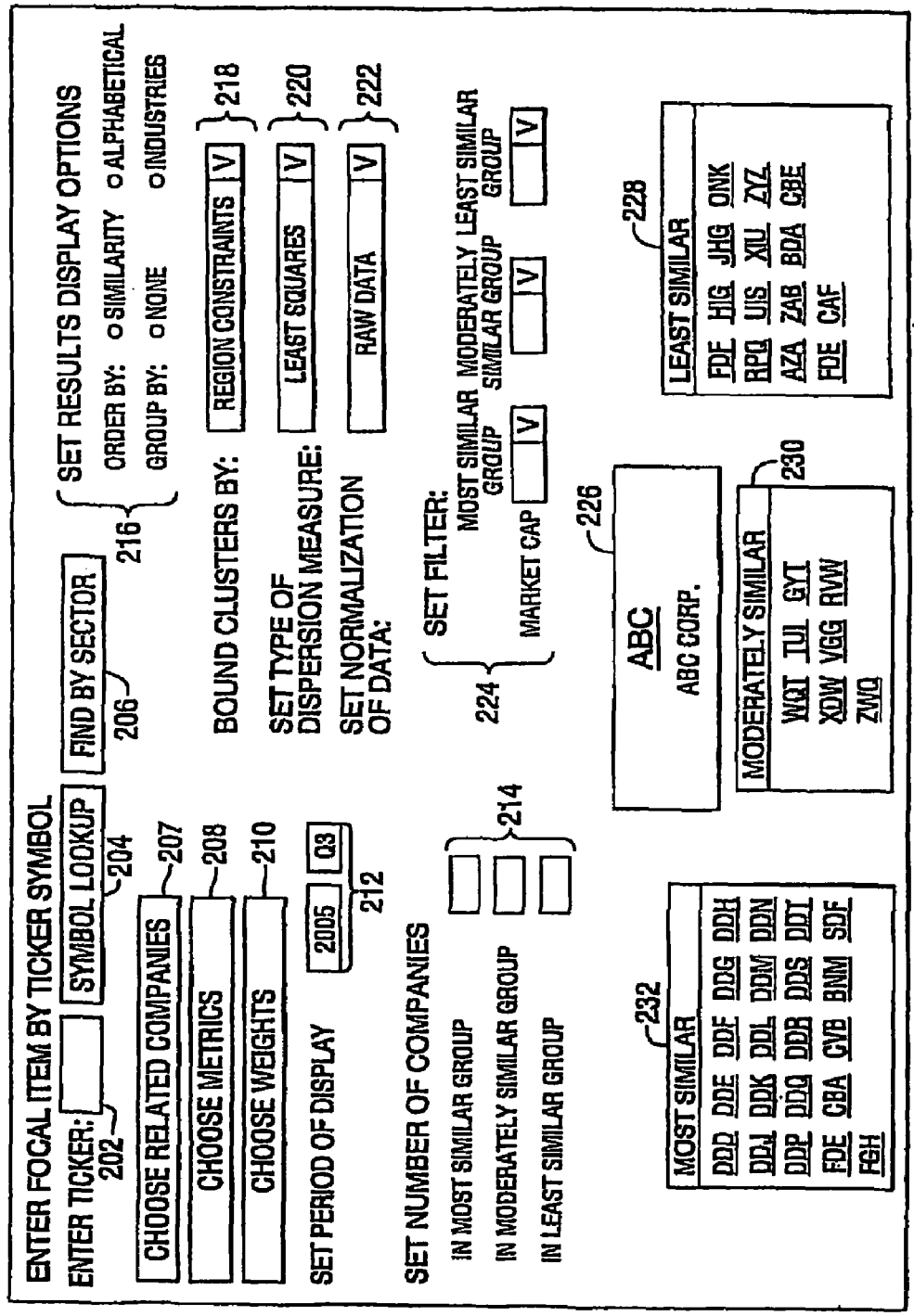

FIG. 2 shows a diagram of an interactive user interface 200 according to other embodiments of the present invention. A user may utilize the interface 200 to display the similarity between a focal company, for example, represented in field 226, and one or more related companies, for example, represented in fields 228, 230 and 232 based on the degree of similarity of a set of metrics between a focal company related companies. The set of metrics may include one or more metrics. Identifiers for companies whose set of metrics is most similar (or closest) to the focal company's set of metrics are listed in similar company field 232. Identifiers for companies whose set of metrics is moderately similar to the focal company metric are listed in a moderately similar field 230, while identifiers for companies whose set of metrics is least similar to the focal company metrics are listed in a least similar (or not similar) field 228.

Again, in order to allow the user to quickly and visually navigate through the financial relationships between companies, certain of the identifiers of companies listed in fields 228, 230, 232 may contain hyperlinks that, when activated by the user, generate a new display with the company corresponding to the activated hyperlink in the focal company field 226 as a new focal company. The fields 228, 230 and 232 may then be populated with identifiers for companies that are least/not similar, moderately similar, and most similar, respectively, to the new focal company considering the chosen set of metrics. Also, certain of the identifiers listed in fields 228, 230, 232 may have an associated mouseover such that when the user passes a cursor near the identifier a display window (not shown) including additional information about the company is displayed to the user.

The user may select the focal company utilizing input fields 202, 204 and 206. An identifier of the focal company, e.g., a ticker symbol, may be entered in input field 202, for example, in a manner similar to that described above with reference to field 102. Interface 200 may also include symbol lookup features and classification based look-up features when the user selects the "Symbol Lookup" field 204 and the "Find by Sector" field 206 respectively. These look-up features may be similar to those described above with respect to fields 104 and 106 of interface 100.

One or more company attributes or metrics that will form the basis of the similarity determination may be entered by clicking on the "Choose Metrics" input field 208. Selecting input field 208 may launch, for example, the interface 300 as shown in FIG. 3. One or more metrics may be selected for the analysis, for example, in a manner similar to that described above with respect to FIG. 3. Filters may be applied to the set of potential related companies, for example, in a manner similar to that described above with respect to FIG. 4. For example, the user interface 400 shown in FIG. 4 may be served to a user when field 207 is selected.

Figure 5:
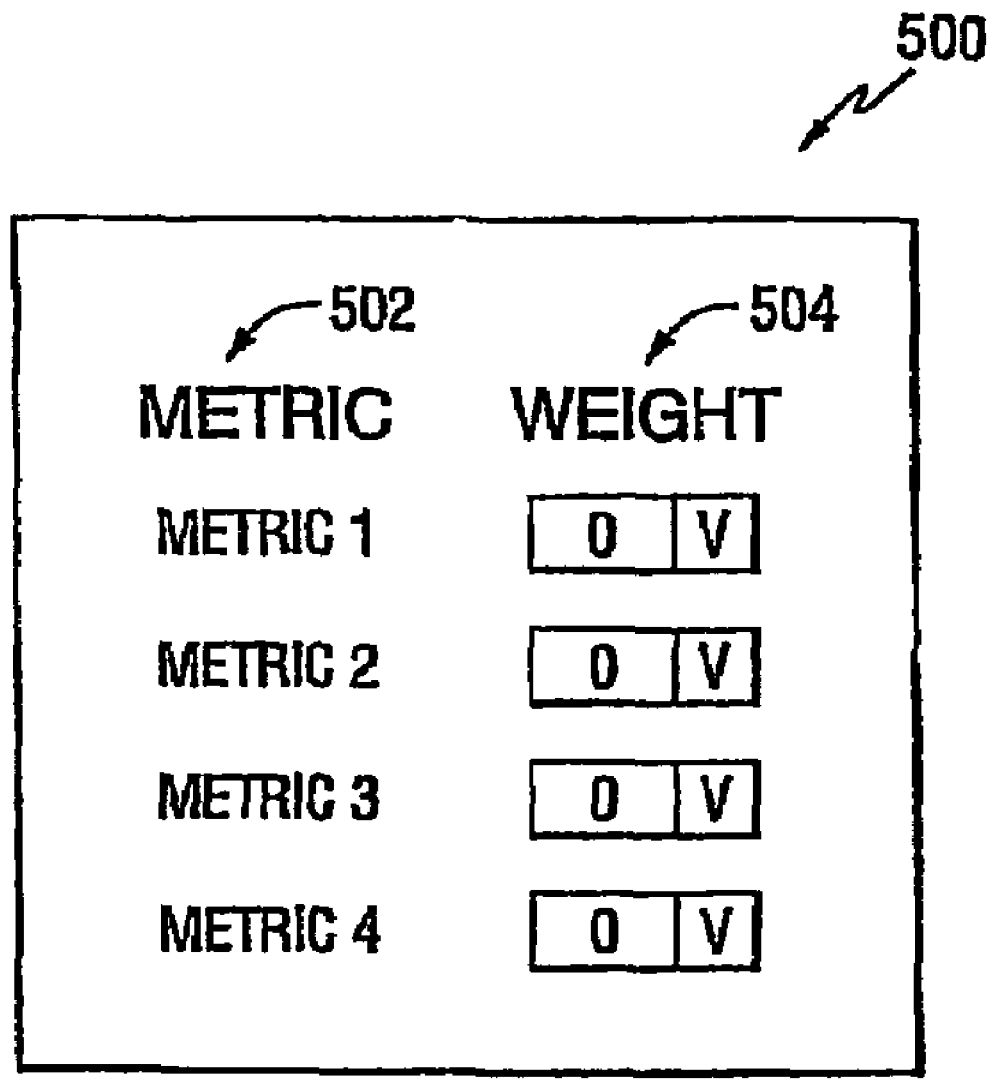

Each metric selected for interface 200 may be assigned a weight in determining the similarity between the focal company and related companies for the set of metrics. Selecting the "Choose Weights" input field 210 may allow the user to select the weights assigned to each metric, for example, by launching interface 500, shown in FIG. 5. Interface 500 shows the chosen list of metrics 502 (e.g., those selected at input field 208) and a corresponding set of input fields 504 for selecting the weight of each of the metrics included in the list 502. The weight values entered in input fields 504 may determine the importance of each of the selected metrics in determining the degree of similarity between the focal company and related company for the set of metrics. Weight values may be expressed in any suitable format including, for example, a percentage, a fraction, an integer, etc.

Referring back to FIG. 2, the time period of data used in the analysis may be selected in input field 212. The time period may be any time unit for which adequate financial data is available, such as, for example, a particular quarter. The user may limit the number of companies listed in each of the fields 228, 230, 232, for example, by entering one or more numerical limits in input fields 214. Filter input fields 224 may also allow the user to filter the results listed in fields 228, 230, 232, for example, by market capitalization, number of employees, etc., for example, as described above with respect to input fields 128.

The user may manipulate the format of the related companies shown in fields 228, 230 and 232, for example, by utilizing "Set Results Display Options" input fields 216. The input fields 216 may allow the user to select the order of related companies as well as the manner in which the related companies will be listed. For example, related companies may be listed by degree of similarity or in alphabetical order. Related companies may be grouped by, for example, sector/industry/sub-industry or by no grouping at all. "Bound Clusters By" input field 218 may allow the user to select bounds for the clusters of related companies shown in input fields 228, 230, 232.

"Dispersion Measure" input field 220 may allow the user to choose the mathematical method used to determine the degree of similarity (or closeness) between the focal company and related companies for the set of metrics. In various embodiments, the mathematical method may be based on finding the distance between two points in an n-dimensional space, where n is the number of metrics being compared. The values of the selected metrics for each of the focal company and the related company may define point coordinates. The degree of similarity between two companies may be gauged by calculating the distance between the points representing the metric values for each company. The distance may be found according to any suitable method, including a squared deviations method, as shown below in Equation (1) or an absolute deviation method, shown below in Equation (2).

$$R=\sqrt{x_1^2+x_2^2+x_3^2...x_n^2}, \text{ where n is the number of selected metrics} \quad (1)$$

$$R=|x_1|+|x_2|+|x_3|...+|x_n|, \text{ where n is the number of selected metrics} \quad (2)$$

At "Normalization of Data" input field 222, the user may select the normalization, if any, to be applied to incoming metric data. The input field 222 may allow the user to select any acceptable data normalization method, or raw data with no normalization at all. For example, the user may select data formatted to Z-scores. Z-scores may be a measure of a particular company's metric value expressed as a number of standard deviations ($\delta$) from the mean ($\mu$) value of the metric for all companies in a given group. The group may be the set of all companies, or a subset, for example, based on a GICS classification. In other various embodiments, the user may select data normalized to a percentile score. A percentile score may be a measure of a particular company's metric value expressed as a rank of the company based on the chosen metric, relative to all other related companies, for example, the set of all companies, a subset based on GICS classification, etc.

It will be appreciated that the interactive user interface 200 shown in FIG. 2 may also provide benefits to financial industry professionals, business people, etc., in for a variety of purposes. For example, navigating the interface 200 may allow a financial analyst to find a related company that responds to certain market conditions the same way that the focal company does. The information may then be used in a hedging and/or pairs trading strategy.

Figure 6:
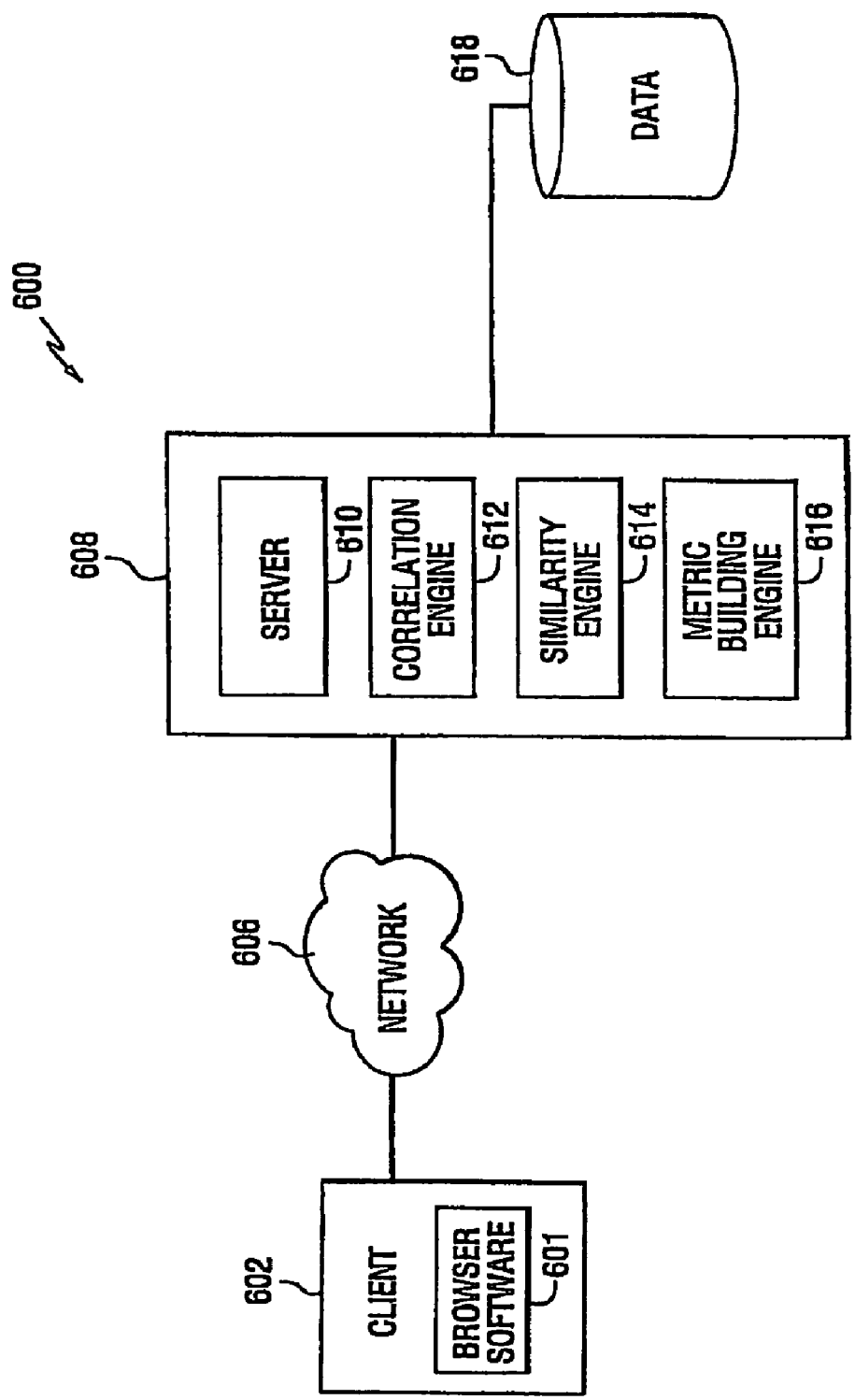
FIG. 6 is a diagram of a system according to various embodiments of the present invention.

The interactive user interfaces described herein may be implemented, in various embodiments, in a client-server environment. FIG. 6 shows a diagram of such a system 600 according to various embodiments. The user may view the interfaces 100, 200, 300, 400, 500 at a client device 602, which may include browser software 604 for displaying web pages or other electronic documents. The client device 602 may be any type of device capable of receiving, rendering and displaying web pages or other electronic documents such as, for example, a portable computer (PC), a laptop computer, a workstation, a web-enabled telephone, etc. The interactive user interfaces may be part of a web page served to the client device 602 from a host computing device 608 (referred to hereinafter as the "host") through a network 606. The host 608, which is shown as a single device in FIG. 6 but which may be embodied as a series of networked computing devices, may include a server 610 for generating the web pages of the interfaces based on data stored in a database 618. The server 610 may serve the generated web pages via the network 606 to the client device 602.

According to various embodiments, the database 618 may include financial data for the potential related companies, including data for the various metrics (if available). That data may be obtained from various publicly available and or proprietary sources. For example, data included in the database 618 may include publicly available data filed by publicly held companies with the United States Securities Exchange Commission (SEC). Other data included in the database 618 may include data from data subscription services, model data that is tagged and extracted from numerous analysts' models of companies, etc.

Referring back to FIG. 6, the host 608 may include a correlation engine 612, a similarity engine 614 and a metric building engine 616. The various engines 612, 614, 616 may be implemented as software code to be executed by a processor(s) (not shown) of the host 608 using any type of computer instruction type suitable, such as, for example, Java, C, C++, Visual Basic, etc., using, for example, conventional or object-oriented techniques. The software code may be stored as a series of instructions or commands on a computer readable medium, such as a random access memory (RAM), a read only memory (ROM), a magnetic medium such as a hard drive or a floppy disk, or an optical medium such as a CD-ROM.

The correlation engine 612 may determine the correlations used in generating the interface 100. For example, the correlation engine 612 may be configured to calculate the correlation between the focal company metric and the related company metric of each related company and determine which related companies should be placed in which fields 134, 136, 138 given the user's specifications. The similarity engine 614 may perform various calculations used in the interface 200 including, for example, determining the "nearest" companies to the focal company for the set of metrics used. For example, the similarity engine 614 may be configured to calculate the similarity between the set of selected metrics for the focal company and the other companies in the database 618. The similarity engine 614 may also be configured to apply various filters and select the related companies to be included in fields 228, 230, 232. The metric building engine 616 may facilitate interface 300. For example, the metric building engine 616 may allow a user to select and/or construct metrics to be used with interfaces 100 and/or 200.

While several embodiments of the present invention have been described herein, it should be apparent that various modifications, alterations and adaptations to those embodiments may occur to persons skilled in the art. It is therefore intended to cover all such modifications, alterations and adaptations without departing from the scope and spirit of the present invention as defined by the appended claims.

What is claimed is:

1. A system for providing a user interface to a user, the system comprising:
   a computer system comprising at least one processor and an operatively associated computer readable medium, wherein the computer readable medium comprises instructions that when executed by the at least one processor causes the computer system to:
      receive data describing a plurality of potential similar companies;
      for each of the plurality of potential similar companies, find a degree of similarity between the potential similar company and a focal company, wherein finding the degree of similarity comprises finding a similarity distance between a first n-dimensional point representing values of a set of financial metrics for the focal company and a second n-dimensional point representing values of the set of financial metrics for the potential similar company, wherein n is the number of metrics in the set of financial metrics, wherein each coordinate of the first n-dimensional point corresponds to a value for one financial metric of the set of financial metrics for the focal company, and wherein each coordinate of the second n-dimensional point corresponds to a value for one financial metric of the set of financial metrics for the potential similar company;
      select from the plurality of potential similar companies at least one similar company having a degree of similarity with the focal company that is greater than a first threshold; and
      display a user interface, the user interface comprising:
         a focal company field listing an identifier for the focal company;
         a metric input field for selecting the set of financial metrics;
         a similar company field listing identifiers for the at least one similar company;
         wherein certain of the identifiers listed in the similar company field include a hyperlink which, when activated by a user, causes the computer system to:
            list the company corresponding to the activated hyperlink as a new focal company in the focal company field;
            determine at least one new similar company having a degree of similarity with the new focal company that is greater than the first threshold; and
            display the at least one new similar company at the similar company field.

2. The system of claim 1, wherein the computer readable medium further comprises instructions that when executed by the at least one processor causes the computer system to find the similarity distance (R) according to:

$$R=\sqrt{x_1^2+x_2^2+x_3^2...x_n^2}$$

wherein R is the similarity distance;
wherein $x_1$ is a difference between a value of a first financial metric for the focal company and a value of the first metric for the potential similar company;
wherein $x_2$ is a difference between a value of a second financial metric for the focal company and a value of the second metric for the potential similar company;
wherein $x_3$ is a difference between a value of a third financial metric for the focal company and a value of the third metric for the potential similar company; and
wherein $x_n$ is a difference between a value of an $n^{th}$ financial metric for the focal company and a value of the $n^{th}$ metric for the potential similar company.

3. The system of claim 1, wherein the computer readable medium further comprises instructions that when executed by the at least one processor causes the computer system to find the similarity distance (R) according to:

$$R=|x_1|+|x_2|+|x_3|\ldots+|x_n|$$

wherein R is the similarity distance;
wherein $x_1$ is a difference between a value of a first financial metric for the focal company and a value of the first metric for the potential similar company;
wherein $x_2$ is a difference between a value of a second financial metric for the focal company and a value of the second metric for the potential similar company;
wherein $x_3$ is a difference between a value of a third financial metric for the focal company and a value of the third metric for the potential similar company; and
wherein $x_n$ is a difference between a value of an $n^{th}$ financial metric for the focal company and a value of the $n^{th}$ metric for the potential similar company.

4. The system of claim 1, wherein the computer readable medium further comprises instructions that when executed by the at least one processor causes the computer system to normalize the focal company's values for the set of financial metrics and the potential similar company's values for the set of financial metrics.

5. The system of claim 4, wherein the normalizing comprises, for each of the focal company's values for the set of financial metrics, calculating a Z-score.

6. The system of claim 1, wherein the computer readable medium further comprises instructions that when executed by the at least one processor causes the computer system to weight at least one of the set of financial metrics prior to finding the degree of similarity.

7. The system of claim 1, wherein the user interface further comprises a least similar field listing identifiers for least similar companies selected from the group of potential similar companies, wherein each least similar company has a degree of similarity with the focal company less than a second threshold.

8. The system of claim 1, wherein the user interface further comprises a moderately similar field listing identifiers for moderately similar companies selected from the group of potential similar companies, wherein each moderately similar company has a degree of similarity with the focal company that is within a first range, wherein the first range excludes the first threshold.

9. The system of claim 1, wherein the focal company's values for the set of financial metrics are taken over a first time period and the similar company's values for the set of financial metrics are taken over a second time period that is offset from the first time period.

10. The system of claim 1, wherein the computer readable medium further comprises instructions that when executed by the at least one processor causes the computer system to apply at least one filter to the plurality of potential similar companies.

11. The system of claim 10, wherein the at least one filter comprises at least one of a market capitalization filter, a filter based on location and a filter based on industry.

12. The system of claim 1, wherein the computer readable medium further comprises instructions that when executed by the at least one processor causes the computer system to receive from a user an indication of a potential similar company.

13. A computer-implemented method for providing a user interface to a user, the method comprising:
    receiving with a computer system data describing a plurality of potential similar companies, wherein the computer system comprises at least one processor and an associated computer readable medium;
    for each of the plurality of potential similar companies and with the computer system, finding a degree of similarity between the potential similar company and a focal company, wherein finding the degree of similarity comprises finding a similarity distance between a first n-dimensional point representing values of a set of financial metrics for the focal company and a second n-dimensional point representing values of the set of financial metrics for the potential similar company, wherein n is the number of metrics in the set of financial metrics, wherein each coordinate of the first n-dimensional point corresponds to a value for one financial metric of the set of financial metrics for the focal company, and wherein each coordinate of the second n-dimensional point corresponds to a value for one financial metric of the set of financial metrics for the potential similar company;
    selecting from the plurality of potential similar companies, with the computer system, at least one similar company having a degree of similarity with the focal company that is greater than a first threshold;
    displaying, with the computer system, a focal company field listing an identifier for the focal company;
    displaying, with the computer system, a metric input field for selecting the set of financial metrics;
    displaying, with the computer system, a similar company field listing identifiers for the at least one similar company;
    wherein certain of the identifiers listed in the similar company field include a hyperlink which, when activated by a user, causes the computer system to list the company corresponding to the activated hyperlink as a new focal company in the focal company field; determine at least one new similar company having a degree of similarity with the new focal company that is greater than the first threshold; and display the at least one new similar company at the similar company field.

14. The method of claim 13, further comprising finding the similarity distance (R) according to:

$$R=\sqrt{x_1^2+x_2^2+x_3^2\ldots x_n^2}$$

wherein R is the similarity distance;
wherein $x_1$ is a difference between a value of a first financial metric for the focal company and a value of the first metric for the potential similar company;
wherein $x_2$ is a difference between a value of a second financial metric for the focal company and a value of the second metric for the potential similar company;
wherein $x_3$ is a difference between a value of a third financial metric for the focal company and a value of the third metric for the potential similar company; and
wherein $x_n$ is a difference between a value of an $n^{th}$ financial metric for the focal company and a value of the $n^{th}$ metric for the potential similar company.

15. The method of claim 13, further comprising finding the similarity distance (R) according to:

$$R=|x_1|+|x_2|+|x_3|\ldots+|x_n|$$

wherein R is the similarity distance;
wherein $x_1$ is a difference between a value of a first financial metric for the focal company and a value of the first metric for the potential similar company;
wherein $x_2$ is a difference between a value of a second financial metric for the focal company and a value of the second metric for the potential similar company;
wherein $x_3$ is a difference between a value of a third financial metric for the focal company and a value of the third metric for the potential similar company; and
wherein $x_n$ is a difference between a value of an $n^{th}$ financial metric for the focal company and a value of the $n^{th}$ metric for the potential similar company.

16. The method of claim 13, further comprising normalizing the focal company's values for the set of financial metrics and the potential similar company's values for the set of financial metrics.

17. The method of claim 16, wherein the normalizing comprises, for each of the focal company's values for the set of financial metrics, calculating a Z-score.

18. The method of claim 13, further comprising displaying a least similar field listing identifiers for companies having a lower than a second threshold degree of similarity with the focal company.

19. The method of claim 13, further comprising displaying a moderately similar field listing identifiers for companies having degrees of similarity with the threshold company in a first range, wherein the first range is less than the first threshold.

20. The method of claim 13, wherein, for purposes of finding the degree of similarity, the focal company's values for the set of financial metrics are taken over a first time period and the related company's values for the set of financial metrics are taken over a second time period that is offset from the first time period.

21. The method of claim 13, further comprising weighting at least one of the set of financial metrics prior to finding the degree of similarity.

22. The method of claim 13, further comprising applying at least one filter to be applied to a set of potential related companies.

23. The method of claim 22, wherein the at least one filter comprises at least one of a market capitalization filter, a filter based on location and a filter based on industry.

24. The method of claim 13, further comprising displaying a related companies input field for allowing a user to select related companies.

* * * * *